United States Patent

Neri et al.

Patent Number: 5,312,222
Date of Patent: May 17, 1994

[54] PROCESS AND DEVICE FOR ALIGNING STACKS OF CUTOUTS IN A PACKAGING MACHINE

[75] Inventors: Armando Neri, Bologna; Mino Cesari, Granarolo Dell'Emilia; Maurizio Rosa, Bologna, all of Italy

[73] Assignee: G.D. S.p.A., Bologna, Italy

[21] Appl. No.: 98,160

[22] Filed: Jul. 28, 1993

Related U.S. Application Data

[63] Continuation of Ser. No. 913,091, Jul. 14, 1992, abandoned.

[30] Foreign Application Priority Data

Jul. 22, 1991 [IT] Italy ............................ 91A000269

[51] Int. Cl.⁵ .............................................. B65G 61/03
[52] U.S. Cl. ...................... 414/788; 414/795.7; 414/788.9; 414/907
[58] Field of Search ............... 414/795.7, 795.8, 786, 414/788, 907, 788.2, 788.9; 901/16

[56] References Cited

U.S. PATENT DOCUMENTS

| | | | |
|---|---|---|---|
| 3,289,861 | 12/1966 | Carle et al. | 414/795.8 |
| 3,788,496 | 1/1974 | Webb et al. | 414/788 |
| 3,842,995 | 10/1974 | Dooley | 414/788 |
| 4,178,118 | 12/1979 | Bailey | 414/788 |
| 4,397,598 | 8/1983 | Ess et al. | 414/788 |
| 4,696,614 | 9/1987 | Moen | 414/788 |
| 4,911,608 | 3/1990 | Krappitz et al. | 414/907 |
| 5,040,942 | 8/1991 | Brinker et al. | 414/907 |
| 5,074,745 | 12/1991 | Neri | 414/796.9 |
| 5,102,292 | 4/1992 | Brinker et al. | 414/907 |
| 5,139,387 | 8/1992 | Boldrini et al. | 414/795.8 |
| 5,178,506 | 1/1993 | Meschi | 414/788 |
| 5,183,380 | 2/1993 | Focke et al. | |

Primary Examiner—Michael S. Huppert
Assistant Examiner—Gregory A. Morse
Attorney, Agent, or Firm—Guido Modiano; Albert Josif; Daniel O'Byrne

[57] ABSTRACT

A process and device for compacting stacks of cutouts in a packaging machine wherein the stacks arranged in an orderly manner are removed by a grip element supported by a head of a removal and transfer unit. The stack is transferred to a compacting station fixedly mounted in a position above a feeding station of the packaging machine. and is inserted in the compacting station which is equipped with an abutment element having an inlet shaped complementarily to one end of the cutouts. Pusher elements which are rigidly associated to the head and frontally define a profile being shaped complementarily with respect to the end of the cutouts opposite to the one inserted in the compacting station, act on the stack upon advancement of the head for inserting the stack in the inlet of the abutment element, thereby compacting the stack.

7 Claims, 2 Drawing Sheets

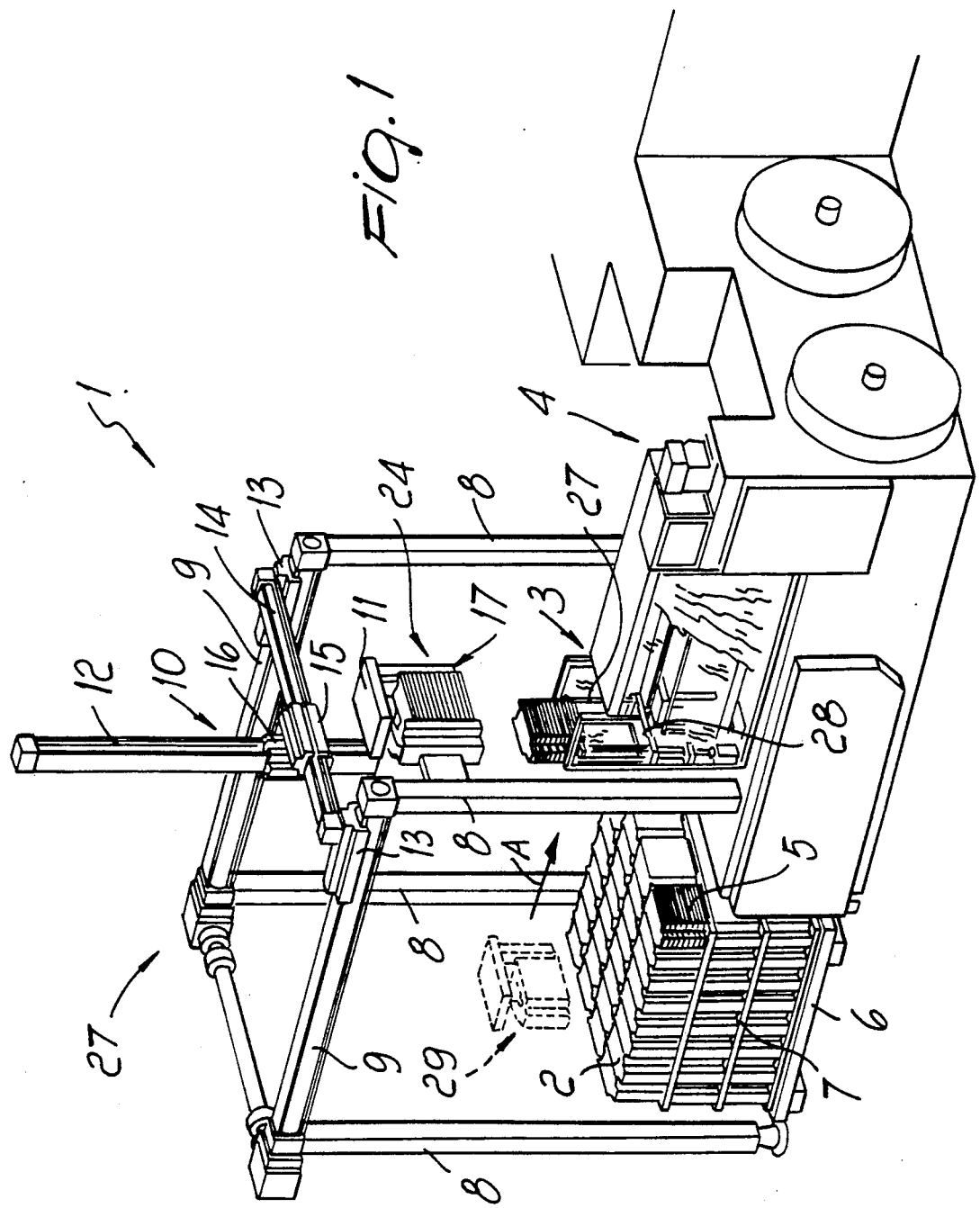

PROCESS AND DEVICE FOR ALIGNING STACKS OF CUTOUTS IN A PACKAGING MACHINE

This is a continuation of application Ser. No. 07/913,091 filed on Jul. 14, 1992, now abandoned.

BACKGROUND OF THE INVENTION

The present invention relates to a process and a device for compacting stacks of cutouts in a packaging machine.

In particular, the present invention relates to a process for compacting stacks of cardboard cutouts in a packaging machine, for example a machine for packaging cigarettes in rigid packets, and to a device which performs this process.

It is known that said packaging machines are fed with stacks of cardboard cutouts intended to constitute the outer container of the packets.

In particular, the stacks of cutouts are supplied in an orderly arrangement in layers formed by a plurality of parallel rows on conventional pallet-like support means.

The stacks removed by the elements which feed the packaging machine can easily be jumbled, i.e. part of the cardboard cutouts may not be perfectly aligned. This obviously compromises the correct insertion of said stacks inside a hopper-like container which feeds a separator element which is suitable to separate the individual cutouts to be transferred to the processing line of the machine.

SUMMARY OF THE INVENTION

The aim of the present invention is to solve the above problem by means of a process and device which allow to automatically compact the stacks of cardboard cutouts to be fed to a packaging machine.

According to the present invention, a process is provided for compacting stacks of cutouts in a packaging machine, characterized in that it provides for: the removal of a stack of cutouts by means of a grip element supported by the head of a removal and transfer unit which can move vertically and horizontally; the insertion of said stack of cutouts in a compacting station equipped with an abutment element which has an inlet shaped complementarily to one end of said cutouts; the opening of said grip element, so as to leave said stack resting on adapted supporting means; and the actuation of the advancement of said head, so as to act on said stack with pusher elements rigidly associated with said head, making it slide until said end of the cutouts is inserted in said inlet of the abutment element.

The present invention furthermore relates to a device for compacting stacks of cutouts in a packaging machine.

According to the present invention, a device is provided for compacting stacks of cutouts in a packaging machine, characterized in that it comprises: a stack gripping element which is supported by a head of a removal and transfer unit which can move vertically and horizontally; pusher elements which are rigidly associated with said head and frontally define a profile which is complementary to an end of the cutouts of said stack, said pusher elements being suitable to act on said stack at said end; and a station for compacting said stack, provided with an abutment element which is suitable to receive said stack removed and transferred by said grip element, the profile of said abutment element being complementary to the end of said cutouts which is opposite to the one on which said pusher elements act at said station.

BRIEF DESCRIPTION OF THE DRAWINGS

The invention is now described with reference to the accompanying drawings, which illustrate a non-limitative embodiment thereof, wherein:

FIG. 1 is a perspective view of an apparatus for feeding a packaging machine equipped with the device according to the invention;

DESCRIPTION OF THE PREFERRED EMBODIMENTS

Figure 3:
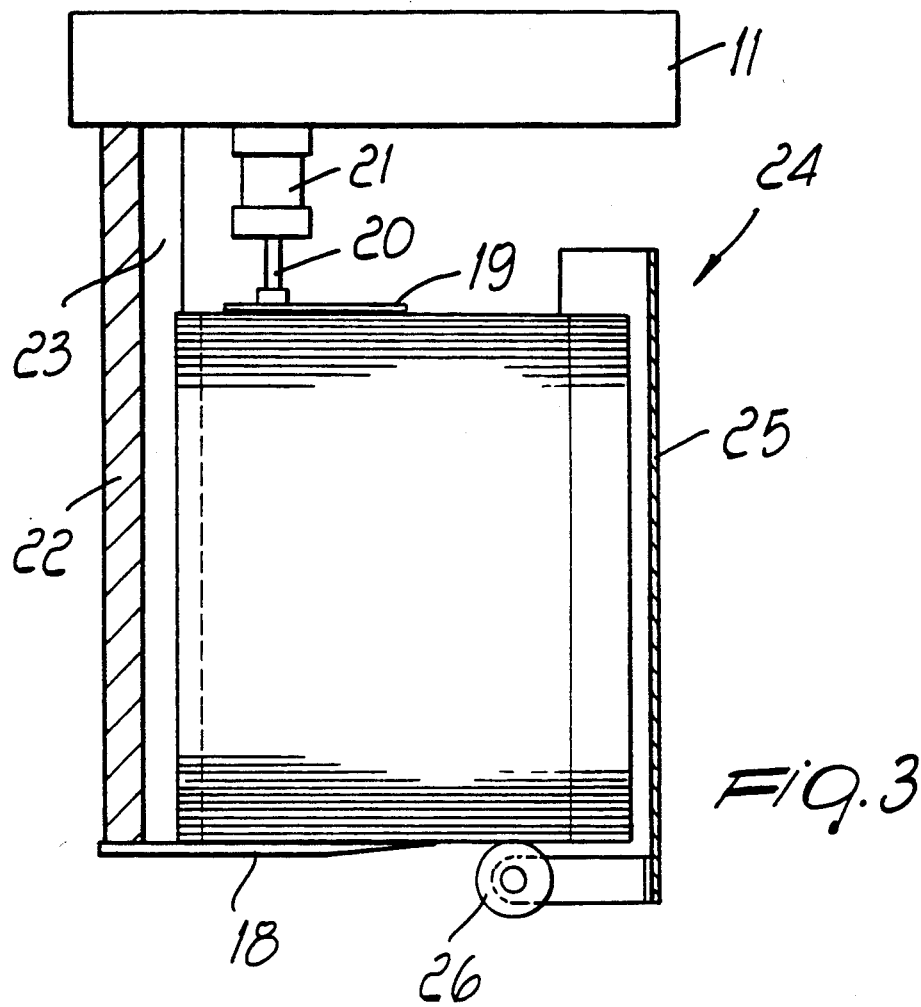
FIG. 3 is a side elevation view of said compacting station.

With particular reference to said figures, the reference numeral 1 generally designates an apparatus which feeds stacks of cardboard cutouts 2 to a hopper 3, which constitutes a station for feeding a packaging machine 4.

The cardboard cutouts 2 have a substantially rectangular shape which has, at its ends, a tab 2a and a trapezoidal recess 2b respectively; appropriate folding and cutting lines, suitable to allow the subsequent packaging operations, are furthermore provided in the cutouts.

Said cutouts 2 are provided in stacks 5 which are arranged in an orderly manner on pallet-like supporting means 6. In particular, said stacks 5 are arranged mutually side by side along their longer sides, so as to form parallel rows, and said rows are in turn arranged side by side along the shorter sides of the stacks.

The stacks 5 are furthermore arranged so as to form superimposed layers which are separated from one another by means of flat elements 7.

The apparatus 1 has a fixed frame which comprises two pairs of uprights 8 which rise symmetrically along the vertices of a quadrilateral. The uprights 8 have, at their top, a pair of cross-members 9 which are arranged horizontally parallel and on which a unit for removing and transferring the stacks 5 of cardboard cutouts, generally designated by the reference numeral 10, can move horizontally.

The removal and transfer unit 10 has a head 11 which is mounted at the lower end of a vertical member 12. The members 9 slidingly support respective sliders 13 which are mutually connected by a cross-member 14 and can be actuated by means of conventional actuation elements, not illustrated in the drawing. The cross-member 14 slidingly supports a sleeve 15 which can be actuated by an appropriate conventional actuation element (not illustrated); a further sleeve 16 is coupled to the sleeve 15 and is perpendicular thereto; the vertical member 12 is slidingly mounted in said sleeve 16 and can be actuated by a related conventional actuation element (not shown). The removal head 11 is provided with a substantially clamp-shaped element 17 for selectively gripping the stacks 5 of cutouts.

The grip element 17 is provided with a horizontal supporting lamina 18 of appropriate elasticity which extends below the head 11 and which is suitable to be inserted below the stack 5 to be removed.

A presser element 19 is suitable to cooperate with the supporting lamina 18 and it can move in an upper and median position with respect to said lamina 18. The presser element 19 is mounted at the end of the stem 20 of an appropriate actuation element 21 which is supported with a vertical axis by the head 11.

A plate 22 furthermore extends vertically downward from the head 11 and comprises a pair of pusher elements 23 which cooperate so as to frontally define a prism-shaped dovetail profile shaped complementarily with respect to the trapezoidal recess 2b of the cutouts 2. The pusher elements 23 extend vertically side by side in a rearward position with respect to the lamina 18 and to the presser 19. The supporting lamina 18 is fixed to the plate 22 in a downward position.

Above the hopper 3 there is a station 24 in which the stack 5 to be inserted in said hopper 3 is compacted. Said station 24, which can be seen in detail in FIGS. 2 and 3, has an abutment element 25 constituted by a profiled element which, for example, can be fixedly mounted on one of the uprights 8 (FIG. 1), and which defines, on a horizontal plane, an inlet 25a, whose shape is complementary to the shape of the tab 2a of the cutouts 2, and opposite divergent wings 25b which are suitable to act as guides toward the inlet 25a.

Figure 2:
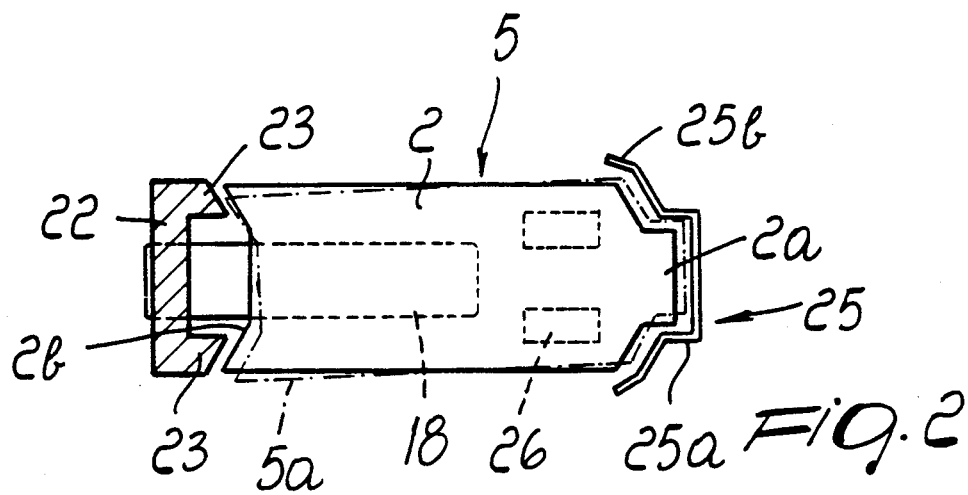
FIG. 2 is a plan view of a compacting station of the device according to the invention.

As it can be seen from FIG. 2 said pusher elements 23 and abutment element 25 comprise inclined surfaces being convergent towards the pushing direction of said pusher elements 23. Such inclined surfaces cooperate with correspondingly inclined surfaces of a stack 5 defined by the ends of said cutouts 2 comprising said trapezoidal recesses 2b and respectively said tabs 2a.

The abutment element 25 is open upward and downward, and a pair of rollers 26 is mounted at its open bottom, in front of the inlet 25a; said rollers can rotate about a horizontal axis which is transverse to said abutment element 25.

The hopper 3 is constituted by a plurality of angular profiled elements 27 which are arranged vertically along the vertices of a rectangle and which are suitable to guide the stack 5; said profiled elements 27 extend from a frame 28 which supports the stack 5 and surmounts a per se known separator element which is suitable to separate the individual cutouts 2 of the stack to be transferred to the processing line of the packaging machine 4.

In use, the pallet 6 which carries the stacks 5 of cutouts 2 to be transferred to the packaging machine 4 is inserted at the base of the apparatus 1 between the two pairs of uprights 8.

In this position, the pallet 6 is arranged below the removal and transfer unit 10 which can move on the members 9.

In particular, the removal head 11 is suitable to be moved along three orthogonal axes; it can therefore be positioned above the stack 5 to be transferred and then be lowered in front of said stack. The movements of the head 11 are controlled by an appropriate known control unit (not shown) of the self-learning type normally used on three-axis measurement machines.

The supporting lamina 18 of the grip unit 17 is moved forward so that it is inserted below the stack 5 to be transferred, elastically skimming the flat separation element 7. It should be noted that the lamina 18 is inserted parallel to the longer sides of the cutouts 2, on the side of the trapezoidal recess 2b.

After the insertion of the supporting lamina 18 below the stack 5, the presser element 19, upon the actuation of the respective actuation element, is lowered into contact with the upper surface of said stack.

The stack 5, clamped between the supporting lamina 18 and the presser element 19, is then raised above the related layer, as indicated by the broken lines 29, and then moved in the transfer direction A, which is parallel to the members 9, until it arrives in front of the compacting station 24.

It should be noted that during the transfer step the stack 5 is arranged so that the longer sides of the cutouts 2 are horizontally perpendicular to the transfer direction A The stack 5 is subsequently inserted, on the side of the tab 2a of the cutouts, in the abutment element 25, so as to rest on the rollers 26 (see FIGS. 2 and 3).

It should be noted that when it is inserted in the abutment element 25, the stack 5 is partially jumbled, as shown by the broken line 5a.

At this point the rise of the presser element 19 is actuated, so as to leave the stack 5 resting on the lamina 18 and on the rollers 26, and the advancement of the head 11 in the direction of the abutment element 25 is subsequently actuated.

By virtue of this advancement, the pusher elements 23, which are rigidly associated with the head 11, engage the complementarily shaped trapezoidal recess 2b of the cutouts and push the stack 5 against the abutment element 25.

Therefore, the jumbled cutouts of the stack 5 are guided by the wings 25b so that they assume the compacted longitudinally aligned position defined by the insertion of the respective tabs 2a within the complementarily shaped inlet 25a.

Conveniently, the grip element 17 is provided with conventional sensor elements which are suitable to control the advancement of the head 11 so as to avoid the compression of the stack 5.

Once the step of compacting the stack 5 has been completed, the lowering of the presser element 19 is again actuated so that it makes contact with the upper surface of said stack. The compacted stack 5, clamped by the grip element 1 7, is then extracted from the station 24, transferred above the feed hopper 3 and then inserted in said hopper 3 and released by the grip element 17.

To conclude, the described process allows to automatically compact stacks of cardboard cutouts to be fed to the packaging machine. In particular, the compacting step is performed on-line during the transfer of the stacks to the packaging machine, allowing to maintain a high operating speed.

Said process is furthermore performed by means of a constructive solution which is simple in concept, with evident advantages in terms of functionality and reliability in use.

We claim:

1. Process for compacting stacks of cutouts in a packaging machine, comprising the steps of:

selectively gripping a stack of cutouts arrange din an orderly manner on supporting means by means of a grip element supported by a head of a removal and transfer unit which can move vertically and horizontally above said supporting means;

removing said stack of cutouts from said supporting means;

transferring said stack of cutouts to a compacting station fixedly mounted in a position above a station for feeding said packaging machine;

inserting said stack of cutouts in said compacting station equipped with an abutment element with inclined surfaces which has an inlet shaped complementarily to one end of said cutouts;

opening said grip element, so as to leave said stack resting on adapted supporting means;

advancing said head in a pushing direction, so as to act on said stack by means of pusher elements with inclined surfaces which are rigidly associated with said head, and making said head slide until said end of the cutouts is inserted in said inlet of the abutment element;

compacting said stack of cutouts by pushing action of said inclined surfaces of said pusher elements towards said inclined surfaces of said abutment element, the inclined surfaces of said pusher elements and of said abutment element being convergent towards said pushing direction of said head;

actuating said grip element for clamping said compacted stack; and transferring said stack of cutouts to said station for feeding said packaging machine.

2. Device for compacting stacks of cutouts in a packaging machine, comprising: a grip element for gripping a stack, being supported by a head of a removal and transfer unit which can move vertically and horizontally; pusher elements, rigidly associated with said head, which frontally define a profile being shaped complementarily with respect to an end of the cutouts of said stack, said pusher elements being suitable to act on said stack at said end upon advancing said head in a pushing direction; and a station for compacting said stack, fixedly mounted in a position above a station for feeding said packaging machine, said station for compacting said stack being provided with an abutment element which is adapted to receive said stack removed and transferred by said grip element and whose profile is complementary to the end of said cutouts which is opposite to the one which said pusher elements act at said station, said pusher elements and said abutment element comprising inclined surfaces being convergent towards said pushing direction of said head.

3. Device according to claim 2, wherein said cutouts forming said stacks have a substantially rectangular shape with an end thereof comprising a tab and the opposite end comprising a trapezoidal recess, and said abutment element has a profiled element which defines, on a horizontal plane, an inlet whose shape is complementary to said tab of said cutouts, and opposite divergent wings which are suitable to act as guides toward said inlet.

4. Device according to claim 2, wherein said compacting station is provided with roller means which can rotate about a horizontal axis which is transverse with respect to said abutment element and are suitable to act as support for said stack.

5. Device according to claim 2, wherein said cutouts forming said stacks have a substantially rectangular shape with an end thereof comprising a tab and the opposite end comprising a trapezoidal recess, and said pusher elements extend vertically so as to frontally define a dovetail prism-shaped profile which is shaped complimentarily to said trapezoidal recess of said cutouts.

6. Device according to claim 2, wherein said grip element has a substantially horizontal supporting lamina which extends below said head and is suitable to be inserted below the stack to be removed and transferred.

7. Device according to claim 2, wherein said grip element has a presser element which is suitable to cooperate with said supporting lamina and can move above said lamina so as to secure, in an upward position, said stack to be removed.

* * * * *